United States Patent
Park et al.

(10) Patent No.: US 12,148,396 B2
(45) Date of Patent: Nov. 19, 2024

(54) DISPLAY DEVICE AND A METHOD OF DRIVING THE SAME

(71) Applicant: Samsung Display Co., Ltd., Yongin-si (KR)

(72) Inventors: So Young Park, Yongin-si (KR); Hyo Jin Lee, Yongin-si (KR); Hwal Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/219,876

(22) Filed: Jul. 10, 2023

(65) Prior Publication Data

US 2024/0203363 A1    Jun. 20, 2024

(30) Foreign Application Priority Data

Dec. 14, 2022    (KR) .......................... 10-2022-0175154

(51) Int. Cl.
*G09G 3/3291*       (2016.01)
*G06F 3/041*        (2006.01)
*G06F 3/044*        (2006.01)
*G06F 3/0488*       (2022.01)

(52) U.S. Cl.
CPC ......... *G09G 3/3291* (2013.01); *G06F 3/0412* (2013.01); *G06F 3/041* (2013.01); *G06F 3/044* (2013.01); *G06F 3/0488* (2013.01)

(58) Field of Classification Search
CPC ..... G09G 3/3291; G06F 3/041; G06F 3/0412; G06F 3/044; G06F 3/0488
USPC ........................................................ 345/76
See application file for complete search history.

(56) References Cited

U.S. PATENT DOCUMENTS

| | | | |
|---|---|---|---|
| 9,921,668 B1* | 3/2018 | Chadda | G06F 3/04182 |
| 10,353,517 B2 | 7/2019 | Fosler | |
| 10,509,503 B2 | 12/2019 | Hwang et al. | |
| 10,705,654 B2* | 7/2020 | Kim | G06F 3/0446 |
| 2012/0044190 A1* | 2/2012 | Yilmaz | G06F 3/044 |
| | | | 345/173 |
| 2015/0268378 A1* | 9/2015 | Chin | G06F 3/0488 |
| | | | 702/150 |
| 2017/0254843 A1* | 9/2017 | Chang | G06F 3/0445 |
| 2017/0285866 A1* | 10/2017 | Heim | G06F 3/04186 |
| 2018/0239443 A1* | 8/2018 | Wakuda | G06F 3/03547 |

(Continued)

FOREIGN PATENT DOCUMENTS

| KR | 10-2020-0040597 | 4/2020 |
|---|---|---|
| KR | 10-2021-0078148 | 6/2021 |
| KR | 10-2325806 | 11/2021 |

*Primary Examiner* — Tom V Sheng
(74) *Attorney, Agent, or Firm* — F.CHAU & ASSOCIATES, LLC

(57) ABSTRACT

A display device including: a display panel configured to display an image; a sensor overlapping the display panel; and a processor connected to the sensor, and configured to sense input from an object, in response to a sensing signal provided from the sensor, wherein the processor obtains, in response to the sensing signal, offset data that corresponds to a case where there is no input, and senses the input by reflecting the offset data to the sensing signal, wherein the processor senses touch input from the object in a first mode, and senses proximity of the object in a second mode, and wherein the processor changes a rule related to obtaining the offset data in response to an event occurring in the second mode.

20 Claims, 14 Drawing Sheets

(56) References Cited

U.S. PATENT DOCUMENTS

| | | | |
|---|---|---|---|
| 2019/0025959 A1* | 1/2019 | Kapoor | H03K 17/955 |
| 2020/0050341 A1* | 2/2020 | Tabata | G06F 3/04166 |
| 2020/0074913 A1* | 3/2020 | Choi | H04W 52/027 |
| 2020/0117308 A1 | 4/2020 | Heo et al. | |
| 2021/0011604 A1* | 1/2021 | Yoganandan | G06F 3/044 |
| 2021/0333924 A1* | 10/2021 | Finnoey | H03K 17/962 |
| 2023/0393691 A1* | 12/2023 | Pundak | G06F 3/0418 |

\* cited by examiner

FIG. 10

| CLASSIFICATION | FIRST TRACKING MODE | SECOND TRACKING MODE |
|---|---|---|
| RATIO (WEIGHTED VALUE) | R1 | R2 (R2 <= R1) |
| 1/CYCLE | P1 | P2 (P2 <= P1) |
| AREA | A1 | A2 (A2 <= A1) |

DISPLAY DEVICE AND A METHOD OF DRIVING THE SAME

CROSS-REFERENCE TO RELATED APPLICATION

The present application claims priority under 35 U.S.C. § 119 to Korean patent application number 10-2022-0175154, filed on Dec. 14, 2022, the disclosure of which is incorporated by reference herein in its entirety.

TECHNICAL FIELD

Various embodiments of the present disclosure relate to a display device and a method of driving the same.

DESCRIPTION OF RELATED ART

Display devices may be equipped with both a display component for displaying images, and a sensor component for sensing touch positions. The sensor component may be used to measure the coordinates of an object's touch position and detect the object's proximity or non-proximity.

SUMMARY

Various embodiments of the present disclosure are directed to a display device that can precisely detect inputs (e.g., proximity or non-proximity, or removal or non-removal) from an object. Additionally, the embodiments include a method of driving the display device.

An embodiment of the present disclosure may provide a display device including: a display panel configured to display an image; a sensor overlapping the display panel; and a processor connected to the sensor, and configured to sense input from an object, in response to a sensing signal provided from the sensor, wherein the processor obtains, in response to the sensing signal, offset data that corresponds to a case where there is no input, and senses the input by reflecting the offset data to the sensing signal, wherein the processor senses touch input from the object in a first mode, and senses proximity of the object in a second mode, and wherein the processor changes a rule related to obtaining the offset data in response to an event occurring in the second mode.

The event includes a case where the proximity of the object is sensed, a case where a touch of the object occurs, and a case where display of the image on the display panel is suspended.

The processor changes the rule at a second time point that has passed a preset time from a first time point that corresponds to when the event occurs in the second mode.

The display panel displays the image before the first time point, and the display panel does not display the image after the first time point.

The rule includes information about whether to update the offset data, a ratio at which the sensing signal is applied to the offset data, a cycle of updating the offset data, and an area of the sensor to which an update of the offset data is applied.

The processor suspends an update of the offset data in response to the event.

The processor reduces a ratio at which the sensing signal is applied to the offset data, in response to the event.

The processor reduces a cycle of updating the offset data, in response to the event.

The processor updates the offset data for only a portion of the sensor other than an area of the sensor where the input is received, in response to the event.

The processor changes the rule for only a portion of the sensor where the input is received, in response to the event.

Characteristics of a driving signal for driving the sensor in the first mode are different from characteristics of the driving signal in the second mode, and the characteristics include a number of transmission lines to which the driving signal is simultaneously applied, a voltage level, or a frequency.

An embodiment of the present disclosure may provide a method of driving a display device including a processor connected to a sensor that overlaps a display panel, the method including: operating the display device in a first mode for sensing input from an object, based on a sensing signal output from the sensor; operating the display device in a second mode for sensing proximity of the object, based on the sensing signal; and operating, when an event has occurred in the second mode, the display device in a third mode, wherein in the third mode a rule related to obtaining offset data is changed, wherein the offset data corresponds to a case where there is no input, and the offset data is obtained based on the sensing signal according to the rule.

In the second mode and the first mode, the offset data is obtained according to a first rule, and in the third mode, the offset data is obtained according to a second rule different from the first rule.

The event includes a case where the proximity of the object is sensed, a case where a touch of the object occurs, and a case where display of an image on the display panel is suspended.

Operating the display device in the third mode includes: displaying no image on the display panel from a first time point at which the event occurs; and changing the rule at a second time point that has passed a preset time from the first time point.

The rule includes information about whether to update the offset data, a ratio at which the sensing signal is applied to the offset data, a cycle of updating the offset data, and an area of the sensor to which an update of the offset data is applied.

Operating the display device in the third mode includes suspending an update of the offset data.

Operating the display device in the third mode includes reducing a ratio at which the sensing signal is applied to the offset data.

Operating the display device in the third mode includes reducing a cycle of updating the offset data.

Operating the display device in the third mode includes updating the offset data for only a portion of the sensor other than an area of the sensor where the input is received.

BRIEF DESCRIPTION OF THE DRAWINGS

FIG. 10 is a diagram illustrating set values in first and second tracking modes.

DETAILED DESCRIPTION OF THE EMBODIMENTS

Figure 1:
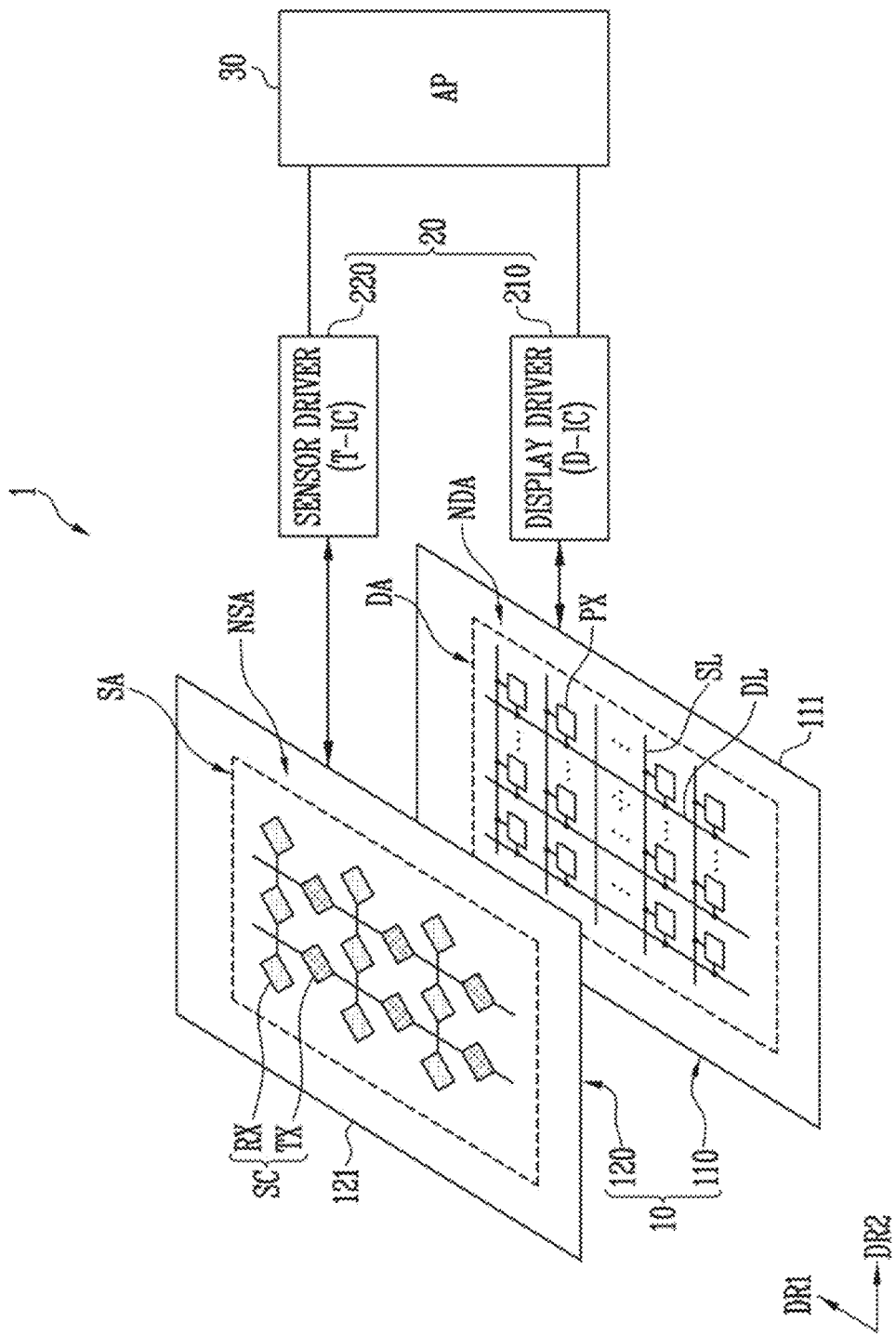
FIG. 1 is a diagram illustrating a display device in accordance with embodiments of the present disclosure.

Hereinafter, embodiments of the present disclosure will be described in detail with reference to the attached drawings, such that those skilled in the art can easily implement the present disclosure. The present disclosure may be implemented in various forms, and is not limited to the embodiments to be described herein below.

In the drawings, portions which are not related to the present disclosure will be omitted to explain the present disclosure more clearly. In this specification, similar reference numerals are used to designate similar components.

In the drawings, the size of each component and the thicknesses of lines illustrating the components therein are represented for the sake of explanation, and the present disclosure is not limited to what is illustrated in the drawings. For example, in the drawings, the thicknesses of the components may be exaggerated to clearly depict multiple layers and areas.

Some embodiments are described in the accompanying drawings in connection with functional blocks, units and/or modules. Those skilled in the art will understand that such blocks, units, and/or modules may be physically implemented by logic circuits, discrete components, microprocessors, hard-wired circuits, memory elements, line connections, and other electronic circuits. The blocks, units and/or modules may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware, which performs some functions, and a processor which performs different functions (e.g., one or more programmed microprocessors and related circuits). Furthermore, in some embodiments, blocks, units and/or modules may be physically separated into two or more individual blocks, units and/or modules which interact with each other. In some embodiments, blocks, units and/or modules may be physically combined into more complex blocks, units and/or modules.

The term "connection" between two components may refer to an electrical connection and physical connection, but the present disclosure is not limited thereto. For example, the term "connection" used in this description with reference to a circuit diagram may refer to an electrical connection, and the term "connection" used in this description with reference to a sectional view or a plan view may refer to physical connection.

It will be understood that, although the terms "first", "second", etc. may be used herein to describe various elements, these elements should not be limited by these terms. These terms are used to distinguish one element from another element. For instance, a first element discussed below could be termed a second element.

Each embodiment to be described below may be implemented alone, or combined with at least another embodiment to make various combinations of embodiments.

FIG. 1 is a diagram illustrating a display device 1 in accordance with embodiments of the present disclosure.

Referring to FIG. 1, the display device 1 may be employed in electronic devices such as a computer, a laptop, a cellular phone, a smart phone, a personal digital assistant (PDA), a potable multimedia player (PMP), a digital TV, a digital camera, a potable game console, a navigation device, a wearable device, an internet of tings (IoT) device, an internet of everything (IoE) device, an e-book, a virtual reality (VR) device, an augmented reality (AR) device, a navigation device for vehicles, a videophone, a monitoring system, an automatic focus system, a tracking system, and a motion sensor system.

The display device 1 may include a panel 10, and a driving circuit component 20 configured to drive the panel 10. Furthermore, display device 1 may further include an application processor 30, or may be connected to the application processor 30.

The panel 10 may include a display component 110 (or a display panel), and a sensor component 120 (or a sensor panel). The display component 110 may display an image. The sensor component 120 may sense (or detect) an external input such as a touch, pressure, a fingerprint, or hovering. For example, the panel 10 may include pixels PX, and sensors SC overlapping at least some of the pixels PX. In an embodiment, the sensors SC may include first sensors TX (or driving electrodes) and second sensors RX (or sensing electrodes). In an embodiment (e.g., in a self-capacitance scheme), the sensors SC may be of the same type of sensors regardless of whether they are the first or second sensors TX or RX.

The driving circuit component 20 may include a display driver 210 configured to drive the display component 110, and a sensor driver 220 configured to drive the sensor component 120. For example, the pixels PX may display an image during each display frame period. For example, the sensors SC may sense an input from a user during each sensing frame period. The sensing frame period and the display frame period may be independent from each other, and be different from each other. The sensing frame period and the display frame period may be synchronized with each other, or may not be synchronized.

In an embodiment, the display component 110 and the sensor component 120 may be separately fabricated, and may then be disposed and/or connected with each other such that at least portions thereof overlap each other. In an embodiment, the display component 110 and the sensor component 120 may be integrally fabricated. For example, the sensor component 120 may be directly formed on at least one substrate (e.g., an upper and/or lower substrate of the display panel, or a thin film encapsulation layer) that forms the display component 110, or other insulating layers or various functional layers (e.g., an optical layer or a passivation layer).

Although FIG. 1 illustrates that the sensor component 120 is disposed on a front side of the display component 110 (e.g., an upper surface, on which an image is displayed), the position of the sensor component 120 is not limited thereto. For example, the sensor component 120 may be disposed on a rear surface or on opposite surfaces of the display component 110. In an embodiment, the sensor component 120 may be disposed on a peripheral area of at least one side of the display component 110. For example, the sensor component 120 may be disposed along an edge of the display component 110.

The display component 110 may include a display substrate 111 and a plurality of pixels PX formed on the display substrate 111. The pixels PX may be disposed in a display area DA of the display substrate 111.

The display substrate 111 may include the display area DA in which an image is displayed, and a non-display area NDA provided around the periphery of the display area DA. In an embodiment, the display area DA may be disposed in a central portion of the display component 110, and the non-display area NDA may be disposed in the peripheral area of the display component 110 to enclose the display area DA.

The display substrate 111 may be a rigid substrate or a flexible substrate, and the material or properties thereof are not particularly limited. For example, the display substrate 111 may be a rigid substrate made of glass or reinforced glass, or a flexible substrate formed of a thin film made of plastic or metal.

Scan lines SL, data lines DL, and pixels PX connected to the scan lines SL and the data lines DL may be disposed in the display area DA. The pixels PX may be selected by scan signals supplied from the scan lines SL, may be supplied with data signals from the data lines DL, and may emit light having luminance corresponding to the data signals. Each of the selected pixels PX may be provided with a scan signal having a turn-on level. Consequently, an image corresponding to the data signals is displayed on the display area DA. In the present disclosure, the structure of the pixels PX and the method of driving the pixels PX are not particularly limited. For example, each of the pixels PX may be implemented as a pixel that employs various known structures and driving methods.

Various lines and/or an internal circuit component which are connected to the pixels PX of the display area DA may be disposed in the non-display area NDA. For example, a plurality of lines for supplying various power and control signals to the display area DA may be disposed in the non-display area NDA. In addition, a scan driver and the like may also be disposed in the non-display area NDA.

In the present disclosure, the type of the display component 110 is not particularly limited. For example, the display component 110 may be implemented as a self-emissive-type display panel such as an organic light emitting display panel. However, when the display component 110 is implemented as a self-emissive type display panel, each of the pixels PX is not limited to the case where the pixel includes only an organic light emitting element. For example, the light emitting element of each of the pixels PX may be formed of an organic light emitting diode, an inorganic light emitting diode, a quantum dot/well light emitting diode, or the like. In an embodiment, a plurality of light emitting elements may be provided in each of the pixels PX. Here, the plurality of light emitting elements may be connected in series, parallel, or series-parallel to each other. Alternatively, the display component 110 may be implemented as a non-emission type display panel such as a liquid crystal display panel. When the display component 110 is implemented as a non-emission type display panel, the display device 1 may further include a light source such as a back-light unit.

The sensor component 120 may include a sensor substrate 121, and a plurality of sensors SC formed on the sensor substrate 121. The sensors SC may be disposed in a sensing area SA on the sensor substrate 121.

The sensor substrate 121 may include a sensing area SA capable of sensing touch input or the like, and a peripheral area NSA formed around the periphery of the sensing area SA. In an embodiment, the sensing area SA may overlap at least one area of the display area DA. For example, the sensing area SA may be set to an area corresponding to the display area DA (e.g., an area overlapping the display area DA). The peripheral area NSA may be set to an area corresponding to the non-display area NDA (e.g., an area overlapping the non-display area NDA). In this case, when touch input or the like is provided on the display area DA, the sensor component 120 may detect the touch input.

The sensor substrate 121 may be a rigid or flexible substrate, and may be formed of at least one insulating layer. Furthermore, the sensor substrate 121 may be a transparent or translucent light-transmissive substrate, but the present disclosure is not limited thereto. In other words, in the present disclosure, the material or properties of the sensor substrate 121 are not particularly limited. Furthermore, in an embodiment, at least one substrate (e.g., the display substrate 111, an encapsulation substrate and/or a thin film encapsulation layer) that forms the display component 110, or at least one insulating layer, functional layer, or the like that is disposed inside and/or outside the display component 110 may be used as the sensor substrate 121.

The sensing area SA may be set to an area (e.g., an active area of the sensor SC) capable of responding to touch input. To achieve this, the sensors SC for sensing touch input or the like may be disposed in the sensing area SA. In an embodiment, the sensors SC may include the first sensors TX and the second sensors RX.

For example, each of the first sensors TX may extend in a first direction DR1. The first sensors TX may be arranged in a second direction DR2. The second direction DR2 may differ from the first direction DR1. For example, the second direction DR2 may be a direction perpendicular to the first direction DR1. In an embodiment, the extension direction and the arrangement direction of the first sensors TX may correspond to conventional configurations. Each of the first sensors TX may have a structure in which first cells each having a relatively large surface area and first bridges each having a relatively small surface area are connected to each other. Although FIG. 1 illustrates the case in which each of the first cells has a diamond form, the first cells may have various forms such as a circular form, a rectangular form, a triangular form, and a mesh form. For example, the first bridges may be integrally formed with the first cells on the same layer. In an embodiment, the first bridges may be formed on a layer different from a layer in which the first cells are formed, and may electrically connect adjacent first cells to each other.

Each of the second sensors RX may extend in the second direction DR2. The second sensors RX may be arranged in the first direction DR1. In an embodiment, the extension direction and the arrangement direction of the second sensors RX may correspond to conventional configurations.

Each of the second sensors RX may have a shape in which second cells each having a relatively large surface area and second bridges each having a relatively small surface area are connected to each other. Although FIG. 1 illustrates that each of the second cells has a diamond form, the second cells may have various forms such as a circular form, a rectangular form, a triangular form, and a mesh form. For example, the second bridges may be integrally formed with the second cells in the same layer. In an embodiment, the second bridges may be formed on a layer different from a layer in which the second cells are formed, and may electrically connect adjacent second cells to each other.

In an embodiment, each of the first sensors TX and the second sensors RX may include at least one of metal, a transparent conductive material, and various other conductive materials, and may thus be electrically conductive. For example, the first sensors TX and the second sensors RX may include at least one of various metals including gold (Au), silver (Ag), aluminum (Al), molybdenum (Mo), chrome (Cr), titanium (Ti), nickel (Ni), neodymium (Nd), copper (Cu), platinum (Pt), and the like, or an alloy thereof. Here, the first sensors TX and the second sensors RX may have a mesh form. Furthermore, the first sensors TX and the second sensors RX may include at least one of various transparent conductive materials including a silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotubes, and graphene. In addition, the first sensors TX and the second sensors RX may include at least one of various conductive materials, and may thus be electrically conductive. Furthermore, each of the first sensors TX and the second sensors RX may have a single-layer structure or a multi-layer structure, and the cross-sectional structure thereof is not particularly limited.

In the peripheral area NSA of the sensor component 120, sensor lines may be intensively disposed to electrically connect the first and second sensors TX and RX to the sensor driver 220 or the like.

The driving circuit component 20 may include the display driver 210 configured to drive the display component 110, and the sensor driver 220 configured to drive the sensor component 120. In an embodiment, each of the display driver 210 and the sensor driver 220 may be implemented as an integrated circuit (IC) (e.g., a display integrated circuit (D-IC), or a sensor integrated circuit (T-IC)). In an embodiment, the display driver 210 and the sensor driver 220 may be at least partially integrated into a single IC.

The display driver 210 may be electrically connected to the display component 110, and may be configured to drive the pixels PX. For example, the display driver 210 may provide data signals to the pixels PX. In an embodiment, the display driver 210 may include a data driver and a timing controller. The scan driver may be separately mounted in the non-display area NDA of the display component 110. In an embodiment, the display driver 210 may include all or at least some of the data driver, the timing controller, and the scan driver.

The sensor driver 220 may be electrically connected to the sensor component 120, and may drive the sensor component 120. The sensor driver 220 may include a sensor transmitter and a sensor receiver. In an embodiment, the sensor transmitter and the sensor receiver may be integrated into one IC, but the present disclosure is not limited thereto.

In embodiments, the sensor driver 220 may periodically set/update offset data (or a baseline) corresponding to a state of no input from an object to accurately determine input from the object, and may reflect the offset data in a sensing signal to sense the input from the object. In other words, the sensor driver 220 can periodically establish or update offset data that corresponds to a state in which there is no input detected from an object. The sensor driver 220 can then reflect the offset data in a sensing signal used to sense an actual input from the object to allow for precise detection of the input from the object. Furthermore, if an event such as an object's proximity or touch occurs, the sensor driver 220 may change the rule, settings, or set value used for setting/updating the offset data. By making adjustments to the rule, settings, or set value of the offset data, sensing errors caused by incorrect offset data setting or updating can be prevented. The setting/update and rule change of the offset data (or the baseline) will be described below with reference to FIG. 6 or the like.

The application processor 30 is electrically connected to the display driver 210, and may provide grayscale values and timing signals for a display frame period to the display driver 210. Furthermore, the application processor 30 is electrically connected to the sensor driver 220, and may receive a sensing signal from the sensor driver 220 or receive input information (e.g., input from the object and a location thereof). For example, the application processor 30 may determine the input from the object (e.g., touch input and coordinates thereof, proximity, and removal) based on the sensing signal. In another example, the sensor driver 220 may determine the input from the object based on the sensing signal, and the application processor 30 may receive, from the sensor driver 220, input information corresponding to a result of the determination.

The application processor 30 may correspond to at least one of a graphics processing unit (GPU), a central processing unit (CPU), an application processor (AP), and the like.

Figure 2:
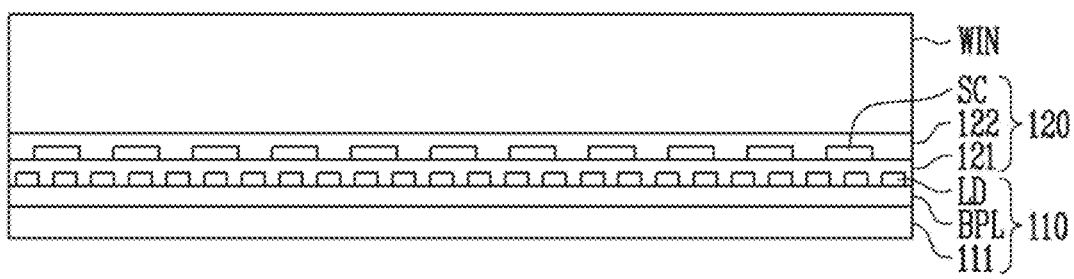
FIG. 2 is a sectional view illustrating an example of the display device of FIG. 1.

FIG. 2 is a sectional view illustrating an example of the display device 1 of FIG. 1.

Referring to FIGS. 1 and 2, the sensor component 120 may be placed over the display component 110. In an embodiment, a window WIN may be placed over the sensor component 120.

The display component 110 may include the display substrate 111, a circuit element layer BPL formed on the display substrate 111, and light emitting elements LD formed on the circuit element layer BPL. The circuit element layer BPL may include the scan lines SL, the data lines DL, and pixel circuits (e.g., a transistor and a capacitor) configured to drive the light emitting elements LD of the pixels PX.

The sensor component 120 may include the sensor substrate 121, the sensors SC formed on the sensor substrate 121, and a protective layer 122 provided to cover the sensors SC. In FIG. 2, there is illustrated an embodiment in which the sensor substrate 121 is provided in the form of an encapsulation layer configured to cover the pixels PX. In an embodiment, the sensor substrate 121 may be provided separately from an encapsulation layer that covers the pixels PX.

The window WIN may be a protective component which is disposed on the uppermost surface of a module of the display device 1, and may be a substantially transparent light-transmissive substrate. The window WIN may have a multilayer structure including at least one selected from among a glass substrate, a plastic film, and a plastic substrate. The window WIN may include a rigid or flexible substrate, and the constituent material of the window WIN is not particularly limited.

The display device 1 may further include, between the window WIN and the sensor component 120, a polarizing plate (or a different type of reflection prevention layer) for prevention of external light reflection.

Figure 3:
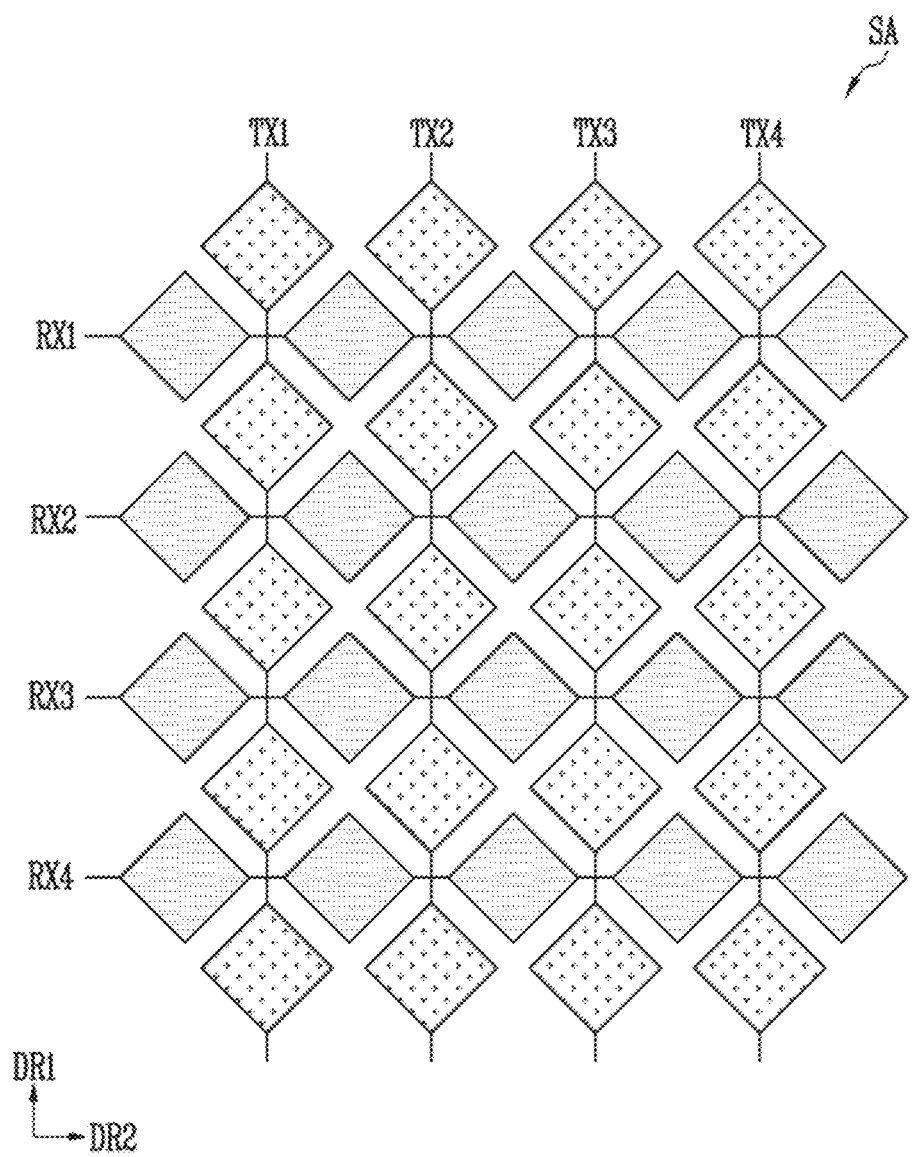
FIG. 3 is a view illustrating sensors included in the display device of FIG. 1 in accordance with an embodiment of the present disclosure.

FIG. 3 is a view illustrating sensors included in the display device 1 of FIG. 1 in accordance with an embodiment.

Referring to FIGS. 1 to 3, there are illustrated first sensors TX1, TX2, TX3, and TX4 and second sensors RX1, RX2, RX3, and RX4 which are located in the sensing area SA. For convenience of explanation, it is assumed that four first sensors TX1 to TX4 and four second sensors RX1 to RX4 are disposed in the sensing area SA. It is to be understood, however, that several tens to several hundreds of first and second sensors TX and RX may be disposed in the display device 1.

Descriptions of the first sensors TX1 to TX4 and the second sensors RX1 to RX4 are the same as that of the first sensors TX and the second sensors RX of FIG. 1; therefore, redundant explanation thereof will be omitted.

Figure 4:
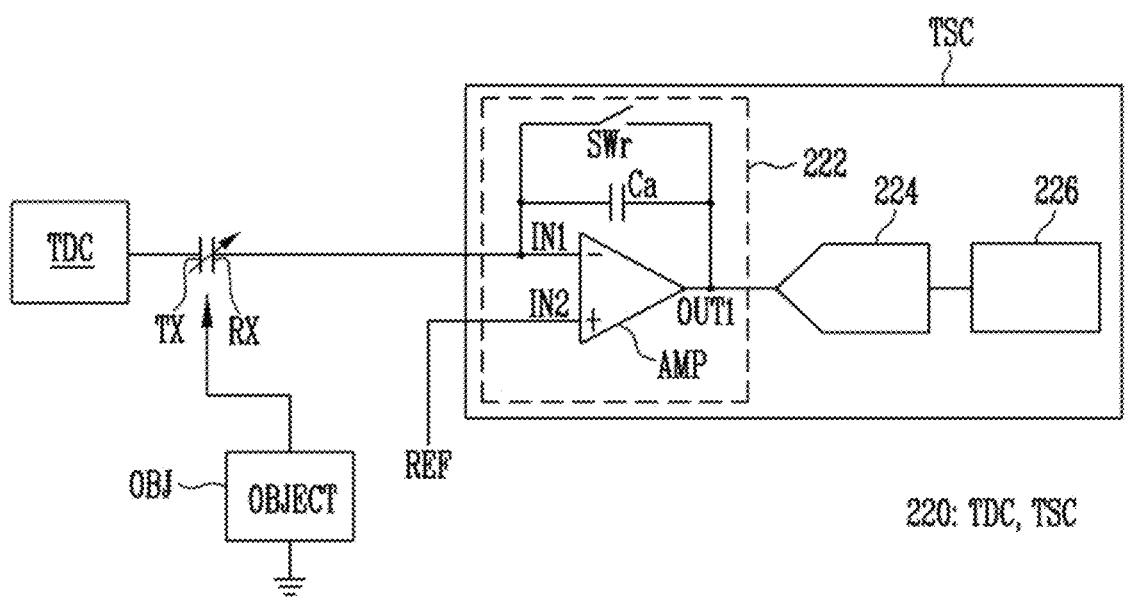
FIG. 4 is a diagram illustrating an example of a sensor driver included in the display device of FIG. 1.
Figure 5:
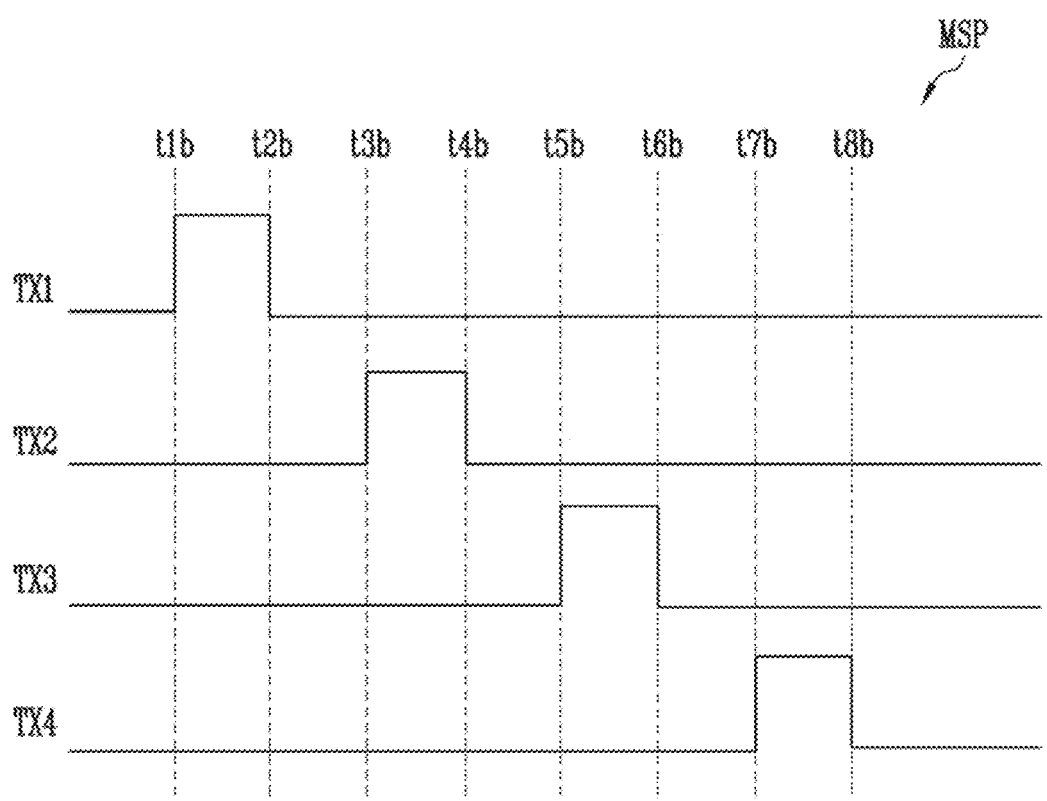
FIG. 5 is a waveform diagram for describing the operation of the sensor driver included in the display device of FIG. 1.

FIG. 4 is a diagram illustrating an example of the sensor driver 220 included in the display device 1 of FIG. 1. FIG. 4 illustrates the configuration of the sensor driver 220 with respect to any one sensor channel 222. For convenience of explanation, FIG. 4 further illustrates first sensors TX, second sensors RX, and an object OBJ. FIG. 5 is a waveform diagram for describing the operation of the sensor driver 220 included in the display device 1 of FIG. 1.

Referring to FIGS. 1 to 5, the sensor driver 220 may include a sensor receiver TSC and a sensor transmitter TDC. The sensor transmitter TDC may be connected to the first sensors TX, and the sensor receiver TSC may be connected to the second sensors RX.

The sensor receiver TSC may include a sensor channel 222, an analog-digital converter 224, and a processor 226. For example, each sensor channel 222 may be implemented as an analog front end (AFE) including at least one operational amplifier AMP. The analog-digital converter 224 and the processor 226 may be provided in each sensor channel 222, or may be shared by a plurality sensor channels 222.

A first input terminal IN1 of the operational amplifier AMP may be connected to the corresponding second sensors RX. A second input terminal IN2 of the operational amplifier AMP may be connected to a reference signal REF. For example, the first input terminal IN1 may be an inverting terminal, and the second input terminal IN2 may be a non-inverting terminal. The reference signal REF may be a ground voltage or a voltage having a certain magnitude. In an embodiment, the reference signal REF may be a signal which is provided through any one second sensor among the second sensors RX.

The analog-digital converter 224 may be connected to an output terminal OUT1 of the operational amplifier AMP. The analog-digital converter 224 may convert output of the operational amplifier AMP to a digital sensing value, and output the digital sensing value. A capacitor Ca and a switch SWr may be connected in parallel between the first input terminal IN1 and the output terminal OUT1.

Referring to FIG. 5, during a sensing period MSP, the sensor driver 220 (e.g., the sensor transmitter TDC) may sequentially supply first driving signals (or signals for driving the sensor component 120 to perform a sensing operation) to the first sensors TX1 to TX4. For example, first driving signals may be supplied to the first sensor TX1 two times t1b and t2b, first driving signals may be supplied to the first sensor TX2 two times t3b and t4b, first driving signals may be supplied to the first sensor TX3 two times t5b and t6b, and first driving signals may be supplied to the first sensor TX4 two times t7b and t8b. The number of times the first driving signals are supplied to each of the first sensors TX1 to TX4 may be greater than two, depending on the embodiment.

Each of the first driving signals may correspond to a rising transition and/or a falling transition. For example, the first driving signal at the time point t1b may correspond to the rising transition. In other words, at the time point t1b, the first driving signal may increase from a low level to a high level. The first driving signal at the time point t2b may correspond to a falling transition. In other words, at the time point t2b, the first driving signal may decrease from a high level to a low level.

The sensor receiver TSC may include a plurality of sensor channels 222 connected to a plurality of second sensors RX. Each of the sensor channels 222 may receive first sensing signals (or first sampling signals) corresponding to first driving signals from the corresponding second sensor RX. For example, at the time point t1b, in response to a first driving signal applied to the first sensor TX1, the sensor channels 222 connected to the second sensors RX1 to RX4 may independently receive first sensing signals. Furthermore, at the time point t2b, in response to a first driving signal applied to the first sensor TX1, the sensor channels 222 connected to the second sensors RX1 to RX4 may independently receive first sensing signals.

In the sensing area SA, depending on a position of the object OBJ such as the finger of the user, mutual capacitance between the first sensors TX1 to TX4 and the second sensors RX1 to RX4 may change, so that the first sensing signals received by the sensor channels 222 may differ from each other. A touch position of the object OBJ may be detected by using a difference between the first sensing signals.

The sensor channel 222 may generate an output signal corresponding to a difference in voltage between the first and second input terminals IN1 and IN2 of the operational amplifier AMP. For example, the sensor channel 222 may amplify a differential voltage between the first and second input terminals IN1 and IN2 by a degree corresponding to a certain gain, and output the amplified voltage.

In an embodiment, the sensor channel 222 may be implemented as an integrator. In this case, the capacitor Ca and the switch SWr may be connected in parallel between the first input terminal IN1 and the output terminal OUT of the operational amplifier AMP. For example, as the switch SWr is turned on before a first sampling signal is received, charges of the capacitor Ca may be initialized. The switch SWr may be in a turned-off state when the first sensing signal is received.

The analog-digital converter 224 may convert an analog signal inputted from each of the sensor channels 222 to a digital signal. The processor 226 may analyze the digital signal and detect the input from the user. The processor 226 may be included in the application processor 30.

Figure 6:
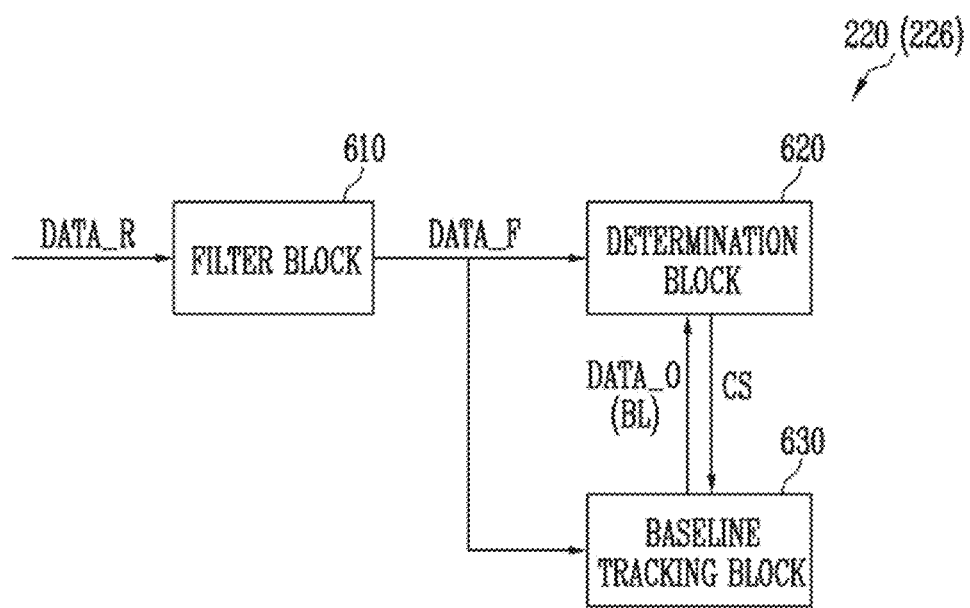
FIG. 6 is a block diagram illustrating an example of the sensor driver included in the display device of FIG. 1.
Figure 7:
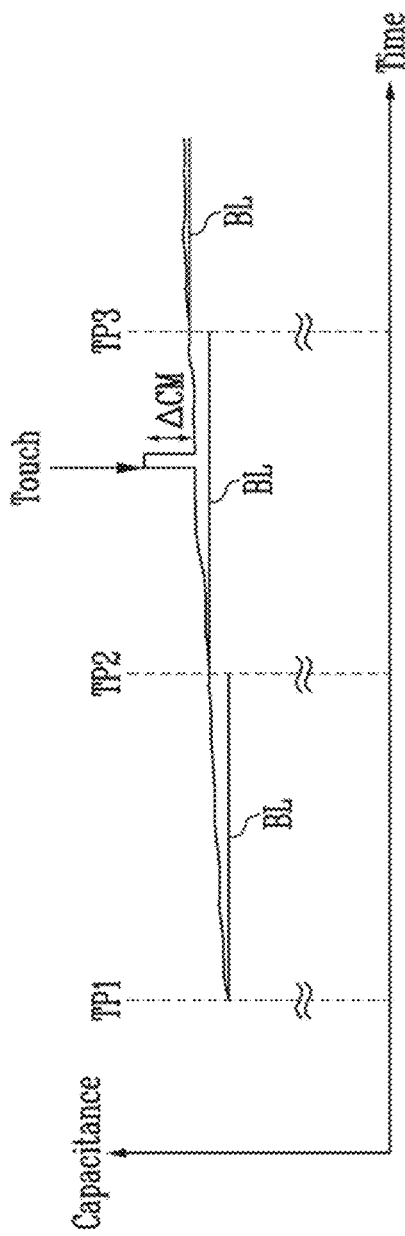
FIG. 7 is a diagram for describing a baseline tracking block included in the sensor driver of FIG. 6.

FIG. 6 is a block diagram illustrating an embodiment of the sensor driver 220 included in the display device 1 of FIG. 1. FIG. 6 schematically illustrates the sensor driver 220 focused on a baseline tracking function. FIG. 7 is a diagram for describing a baseline tracking block 630 included in the sensor driver 220 of FIG. 6.

Referring to FIGS. 1, 4, and 6, the sensor driver 220 (or the processor 226) may include a filter block 610, a determination block 620, and the baseline tracking block 630.

The filter block 610 may receive raw data DATA_R, and may output filtered data DATA_F obtained by removing noise from the raw data DATA_R. Here, the raw data DATA_R may be an output of the analog-digital converter 224 of FIG. 4. For example, the filter block 610 may be implemented as a digital signal processor configured to perform various types of noise filtering functions. In an embodiment, the filter block 610 may be omitted.

The determination block 620 may determine input from the object OBJ (and a location of the input), based on the filtered data DATA_F.

In an embodiment, the determination block 620 may reflect offset data DATA_O (or a baseline, a baseline data) in the filtered data DATA_F, and determine the input. The offset data DATA_O may be provided from the baseline tracking block 630. For example, the determination block 620 may compare the filtered data DATA_F and the offset data DATA_O, or add or subtract the offset data DATA_O to or from the filtered data DATA_F, and then determine the input.

The baseline tracking block 630 may set the offset data DATA_O, based on the filtered data DATA_F (or the raw data DATA_R). The offset data DATA_O may include a baseline BL or an offset for correcting the baseline. The baseline BL may refer to a reference capacitance, or a reference value of each of the capacitances formed between the sensors SC (or the first sensors TX and the second sensors RX) or formed in the sensors SC. For example, the reference capacitance may be a mutual capacitance, which is formed between the first sensors TX and the second sensors RX without input from the object OBJ and is measured by the sensor driver 220. In other words, the reference capacitance, which is measured by the sensor driver 220, may be a mutual capacitance formed between the first sensors TX and second sensors RX in the absence of any input from the object OBJ. In another example, the reference capacitance may be a self-capacitance formed in each of the first sensors TX and the second sensors RX in the absence of input from the object OBJ. The baseline tracking block 630 may set a baseline BL for each of the capacitances formed in the sensor component 120.

Referring to FIG. 7, there is illustrated a capacitance measured at a specific position (e.g., between a specific first sensor TX and a specific second sensor RX) in the sensor component 120. The capacitance (or the reference capacitance) may be changed by surrounding environmental factors. For example, the surrounding environmental factors may include temperature.

For example, the capacitance between the specific first sensor TX and the specific second sensor RX may be proportional to a dielectric permittivity of an insulating layer disposed between the specific first sensor TX and the specific second sensor RX. The dielectric permittivity may vary depending on temperature. For example, as the temperature increases, the capacitance (or the reference capacitance) may be increased.

A variation ACM in capacitance occurs due to a touch, proximity, or the like of the object OBJ. When the magnitude of the variation ACM in capacitance is greater than a reference magnitude, the sensor driver 220 may determine that touch input has occurred. Here, a criteria based on which the variation ACM in capacitance is determined may be the baseline BL.

In an embodiment, the baseline tracking block 630 may periodically set (or obtain) or update the baseline BL (or the offset data DATA_O). Periodically setting or updating the baseline BL may be referred to as baseline tracking.

For example, the baseline tracking block 630 may set a capacitance measured at a first time point TP1 to a baseline BL in a corresponding section. In this case, the corresponding section may be from the first time point TP1 to a second time point TP2. Likewise, the baseline tracking block 630 may set or update a capacitance measured at the second time point TP2 after a specific time has passed after the first time point TP1, to a baseline BL in a corresponding section. In this case, the corresponding section may be from the second time point TP2 to third second time point TP3. The baseline BL from the second time point TP2 to the third time point TP3 may be larger in capacitance than the baseline BL from the first time point TP1 to the second time point TP2. The baseline tracking block 630 may set or update a capacitance measured at the third time point TP3 to a baseline BL in a corresponding section. The baseline BL after the third time point TP3 may be larger in capacitance than the baseline BL from the second time point TP2 to the third time point TP3. For example, a setting cycle (or an updating cycle) of the baseline BL (or the offset data DATA_O) is 0.1 second (or 10 Hz), but is not limited thereto. For example, the setting cycle of the baseline BL may be greater or less than 0.1 second. The setting cycle of the baseline BL may be changed in various ways depending on a particular product, for example.

If the baseline BL (or the offset data DATA_O) is updated when an input is detected from the object OBJ, the resulting capacitance that reflects the input may be incorrectly set to the updated baseline BL. This may cause the input to be canceled or a sensing error. Therefore, to prevent such errors, if a specific event such as input from the object OBJ occurs, such as when the variation ACM in capacitance is maintained, the baseline tracking block 630 may not update (or not set) the baseline BL. Alternatively, the baseline tracking block 630 may update or set the baseline BL using other methods. In other words, when an event such as input from the object OBJ occurs, the baseline tracking block 630 may change a rule (or settings, or a set value) for updating/setting the baseline BL (or the offset data DATA_O). Here, the rule may include information (or set values) about whether the offset data DATA_O has been updated, a ratio (or a weighted value) at which the filtered data DATA_F (or the raw data DATA_R, or the sensing signal) is applied to the offset data DATA_O, a cycle of setting/updating the offset data DATA, and an area (e.g., an area of the sensor component 120) to which the offset data DATA_O is applied or not applied.

For example, the baseline tracking block 630 may suspend updating the offset data DATA_O according to the changed rule. The baseline tracking block 630 may lower the ratio {e.g., a ratio or weighted value at which the filtered data DATA_F (or the raw data DATA_R, or the sensing signal) is applied to the offset data DATA_O} from 100% to 30% according to the changed rule. The baseline tracking block 630 may lower a cycle of setting/updating the offset data DATA_O from 10 Hz to 1 Hz according to the changed rule. The baseline tracking block 630 may reduce an application area of the update of the offset data DATA_O that has been applied to the entire area of the sensor component 120, to a partial area (e.g., a partial area where input from the object OBJ is not generated) according to the changed rule.

In an embodiment, the baseline tracking block 630 may change, based on a control signal CS, the rule for updating/setting the baseline BL (or the offset data DATA_O). The control signal CS may be generated by the determination block 620 in response to the occurrence of an event. For example, the event may include proximity of the object OBJ, a touch of the object OBJ, and the like. However, the present disclosure is not limited to the foregoing. For example, when the determination block 620 or a function corresponding to the determination block 620 is embodied in the application processor 30, the control signal CS may be provided from the application processor 30. In another example, if the event includes the case where display of an image on the display component 110 is suspended, or a low-power driving mode (e.g., a power saving mode) of the display device 1 (or the application processor 30), the control signal CS may be provided from the application processor 30.

As described above, the sensor driver 220 (or the processor 226) may periodically set/update offset data DATA_O (or a baseline BL) that corresponds to a state in which no input is detected. The offset data DATA_O is then reflected or integrated into the raw data DATA_R (or the filtered data DATA_F, or the sensing signal) to allow for precise detection of input from the object OBJ. Furthermore, to prevent sensing errors that may arise from incorrectly setting or updating the offset data DATA_O, the sensor driver 220 may change the rule for setting or updating the offset data DATA_O when an event such as object OBJ proximity or touch occurs.

Figure 8:
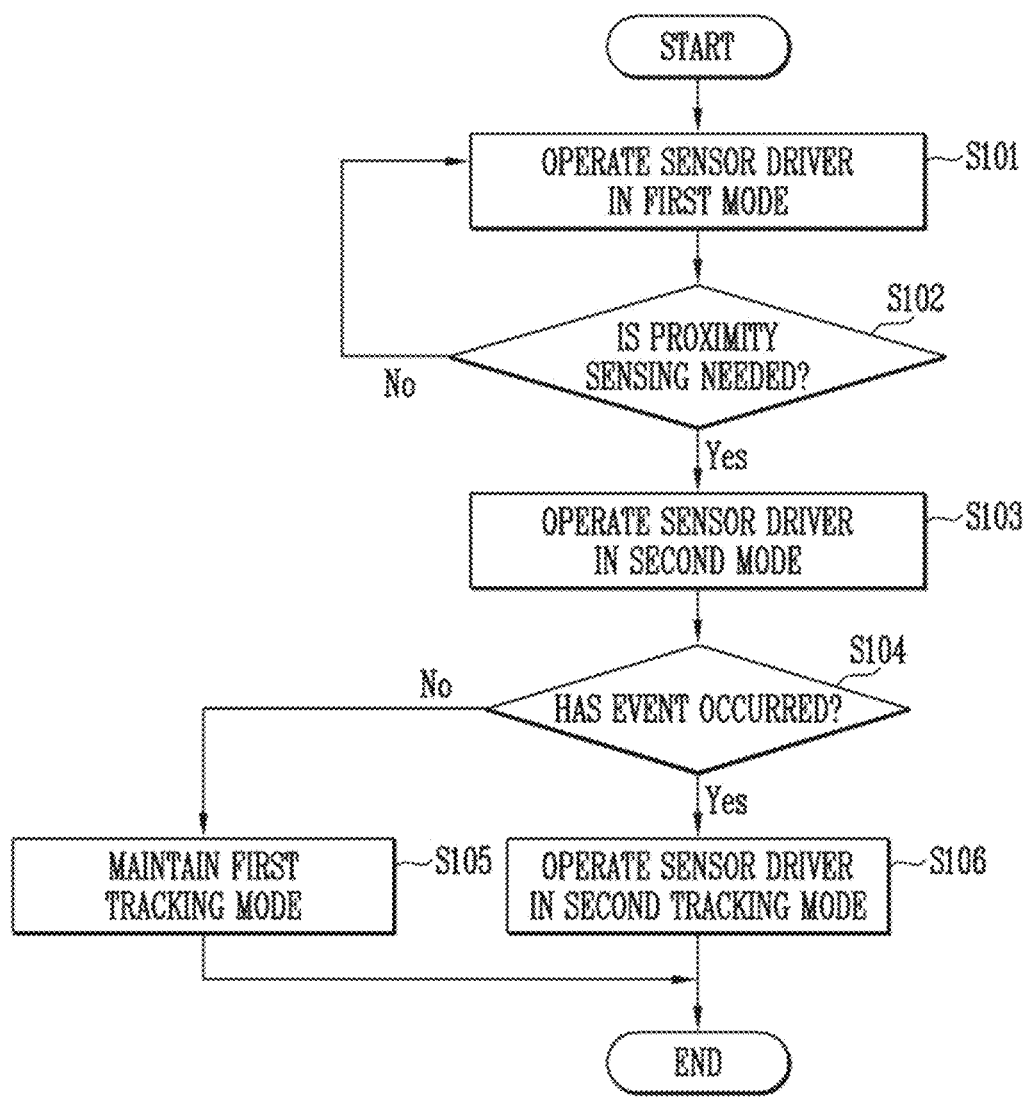
FIG. 8 is a flowchart illustrating a method of driving a display device in accordance with embodiments of the present disclosure.
Figure 9:
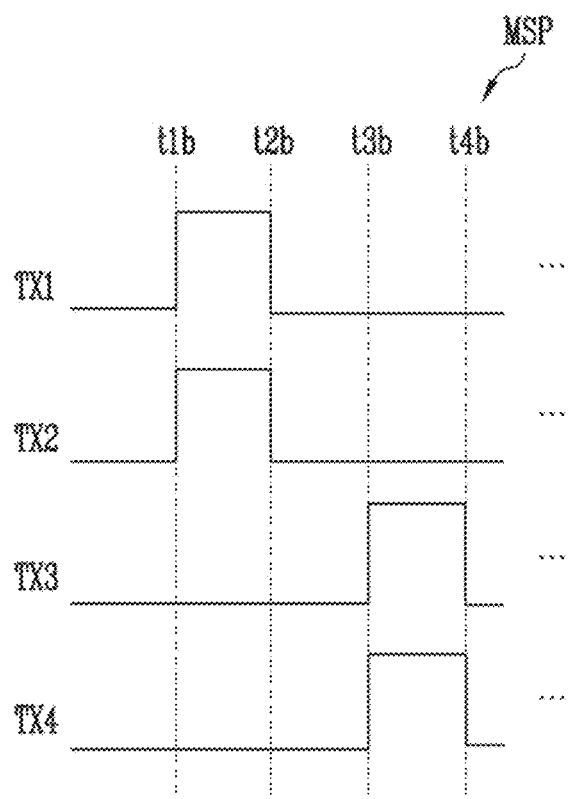
FIG. 9 is a diagram for describing a sensing method in a second mode.
Figure 11:
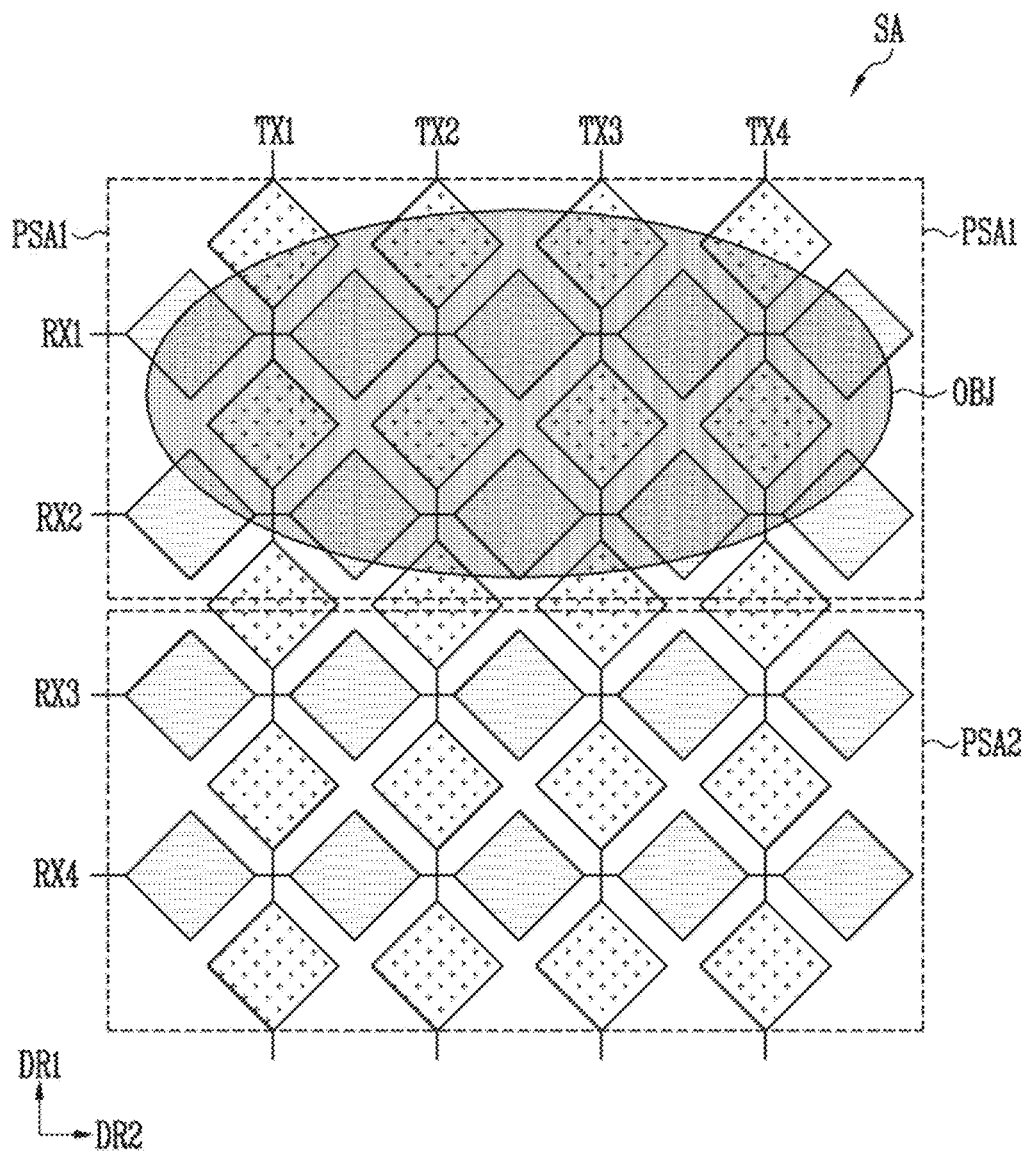
FIG. 11 is a diagram for describing an area to which an update of offset data is applied.
Figure 12:
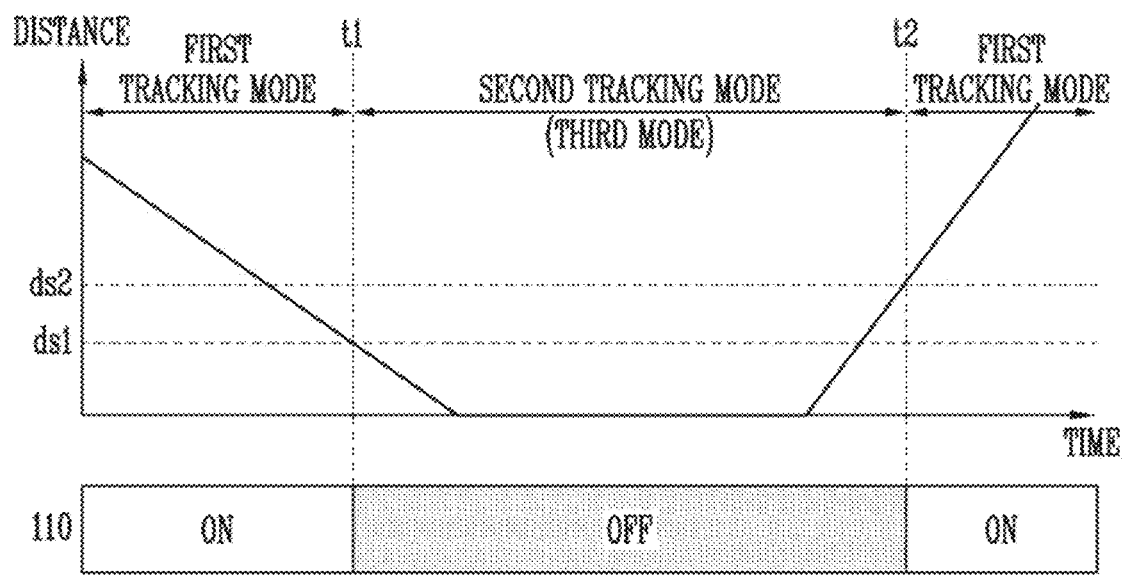
FIGS. 12 and 13 are diagrams for describing a time point of conversion between the first tracking mode and the second tracking mode.
Figure 13:
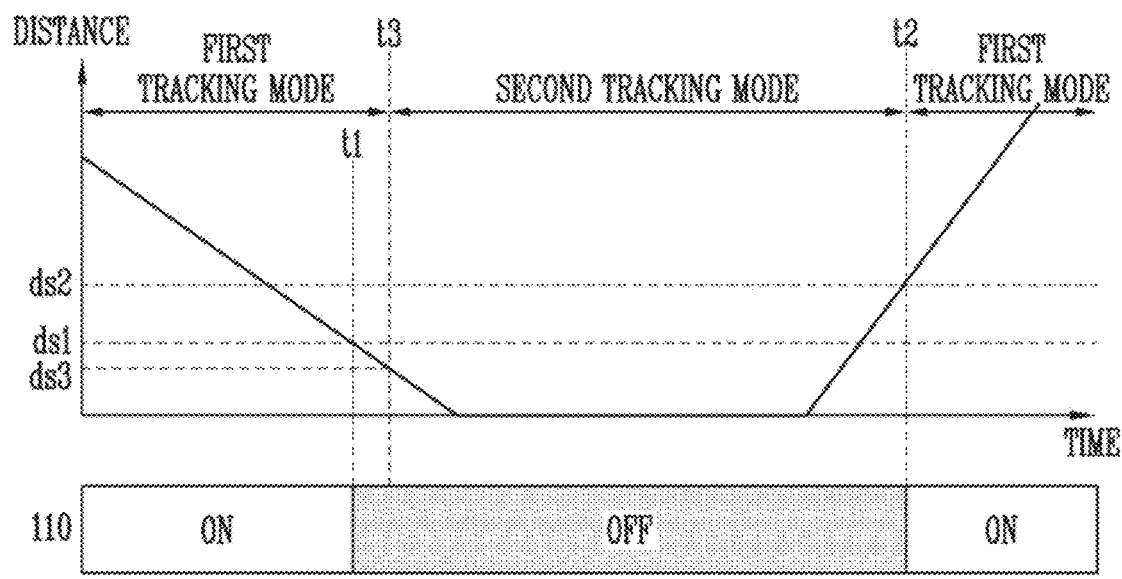
Figure 14:
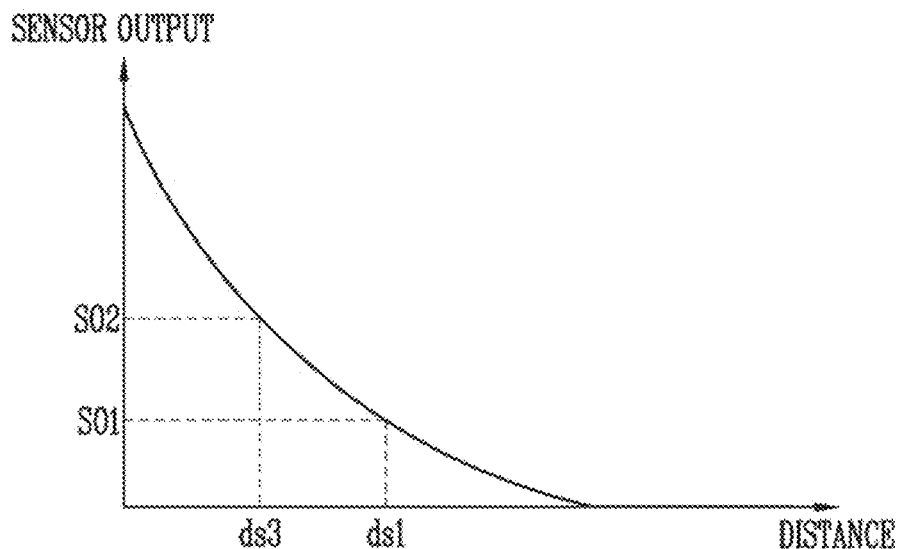
FIG. 14 is a diagram illustrating sensor output as a function of the distance between the sensor component and the object.

FIG. 8 is a flowchart illustrating a method of driving a display device in accordance with embodiments of the present disclosure. FIG. 9 is a diagram for describing a sensing method in a second mode. FIG. 10 is a diagram illustrating set values in first and second tracking modes. FIG. 11 is a diagram for describing an area to which an update of offset data is applied. FIGS. 12 and 13 are diagrams for describing a time point of conversion between the first tracking mode and the second tracking mode. FIG. 14 is a diagram illustrating sensor output as a function of the distance between the sensor component and the object.

Referring to FIGS. 1, 4, 6, and 8 to 14, the method of FIG. 8 may be applied to the display device 1 of FIG. 1 (or the sensor driver 220 of FIG. 6).

The sensor driver 220 (or the display device 1) may be operated in a first mode (at step S101). The first mode may be a mode for a general touch sensing operation. In other words, in the first mode, the sensor driver 220 may sense touch input from the object OBJ (and a location of the touch input). For example, the sensor driver 220 may determine a location (or coordinates) at which a touch of the object OBJ has occurred on the sensor component 120. The sensor driver 220 may drive the entirety of the sensing area SA of the sensor component 120, in the first mode.

The sensor driver 220 may transmit driving signals to the sensing area SA of the sensor component 120 on a basis of p sensors. Here, p is an integer greater than 0. For example, referring to FIG. 5, because a driving signal is transmitted to each first sensor TX at a different timing during the sensing period MSP, p may be 1. In an actual display device in which several tens to several hundreds of first sensors TX are provided, p may be approximately 4. For example, driving signals may be simultaneously supplied to four first sensors TX1 to TX4 and, thereafter, driving signals may be simultaneously supplied to four subsequent first sensors.

While the display device 1 is operated in the first mode, proximity sensing may be needed (S102). For example, proximity sensing may be needed when the user pushes a call button in a phone application of the display device 1. For instance, in the case where the user pushes the call button in the phone application, it can be expected that the display device 1 will contact the ear or the cheek of the user. In this case, there is no need to provide an image to the user. Thus, to determine a time point at which no image is to be displayed on the display component 110, the proximity sensing may be needed.

In the case where it is determined that the proximity sensing is needed, the sensor driver 220 may be operated in a second mode (at step S103). The second mode may be a mode used to sense an approaching movement of the object OBJ during the proximity sensing. In other words, in the second mode, the sensor driver 220 may sense a proximity (or an approach) of the object OBJ.

In an embodiment, the sensor driver 220 may perform a proximity sensing operation on at least a portion of the sensing area SA in the second mode. The sensor driver 220 may perform a proximity sensing operation on a portion of the sensing area SA other than an area (e.g., a touch area) where the touch input has occurred. The reason for this is because the touch input may influence the proximity sensing operation. For example, a variation in capacitance may occur in the touch area due to the touch input. The variation in capacitance may be reflected in the variation in capacitance for the proximity sensing operation. This is because even in the absence of proximity of an object OBJ other than the touch input, the influence of the touch input may cause the sensor driver 220 to incorrectly determine that the object OBJ is present. To remove the influence of the touch input on the proximity sensing operation, the sensor driver 220 may perform the proximity sensing operation only on an area of the sensing area SA other than the touch area, the touch area being the area where the touch input has occurred.

Furthermore, there is also a need to sense touch input in the second mode. For example, there is a need to sense a touch of the finger or the like of the user rather than a large-surface conductor such as the face of the user. For instance, after having pushed the call button in the phone application of the display device 1, the user may push a call cancel button rather than bringing his/her face close to the display device 1. Therefore, in the second mode, the sensor driver 220 may also sense touch input or a touch position on the entirety of the sensing area SA. For example, in the second mode, the sensor driver 220 may alternately perform a proximity sensing operation on a portion of the sensing area SA and a touch sensing operation on the entirety of the sensing area SA. In the second mode, the touch sensing operation and the proximity sensing operation may be combined with each other in various ways in terms of time/space, depending on embodiments.

The sensor driver 220 may receive driving signals on a basis of q sensors to perform the proximity sensing operation in the second mode. In the proximity sensing operation, determining a distance between the object OBJ and the sensor component 120 is more important than determining a touch position. Of course, in the case of the proximity sensing operation, the sensor driver 220 may also determine the touch position although it is roughly performed compared to that of the touch sensing operation. Here, q is an integer greater than p. For example, referring to FIG. 9, q may be 2. Referring to FIG. 9, first, driving signals may be supplied to two first sensors TX1 and TX2 (at t1b and t2b) and, thereafter, driving signals may be supplied to two first sensors TX3 and TX4 (at t3b and t4b). In this case, an electric field at each time point is stronger than that of the touch sensing operation, thus it is possible to calculate a distance between the sensor component 120 and the object OBJ even when the object OBJ is hovering. In an actual display device in which several tens to several hundreds of first sensors TX are provided, q may be approximately 10. For example, driving signals may be simultaneously supplied to ten first sensors TX and, thereafter, driving signals may be simultaneously supplied to ten subsequent first sensors.

In embodiments, the sensor driver 220 may set characteristics of a driving signal to be different between the first and second modes. Here, the characteristics of the driving signal may include at least one of a voltage level, and a frequency (e.g., a toggling frequency of a driving signal), as well as including the number of simultaneous transmission lines (e.g., the number of lines or sensors to which driving signals are simultaneously applied). For example, the voltage of the driving signal in the second mode may be greater than the voltage of the driving signal in the first mode. In this case, even if the object OBJ moves away from the display device 1 (e.g., even if there is no great variation in capacitance resulting from the object OBJ because the object OBJ is spaced apart from the display device 1), proximity or non-proximity of the object OBJ or the distance between the sensor component 120 and the object OBJ may be more accurately detected.

While the sensor driver 220 is operated in the second mode, an event may occur (at step S104). The event may include proximity of the object OBJ, a touch of the object OBJ (e.g., a finger touch, or a finger grip), a low-power driving mode (e.g., a power saving mode) of the display device 1 (or the application processor 30), and turn-off of the display component 110 (e.g., displaying no image on the display component 110). The sensor driver 220 itself may determine the event (e.g., the proximity or touch of the object OBJ), or the application processor 30 may determine the event (e.g., the low-power driving mode, or the turn-off the display component 110). Information about the determined event may be provided to the sensor driver 220.

When the event does not occur, the sensor driver 220 may be maintained in a first tracking mode (at step S105). When the event has occurred, the sensor driver 220 may be operated in a second tracking mode (at step S106). With regard to setting and updating the offset data DATA_O (or the baseline BL), the sensor driver 220 may be operated in the first tracking mode and, in response to occurrence of the event, the sensor driver 220 may be enter the second tracking mode. Furthermore, when the event is no more, the sensor driver 220 may switch back to the first tracking mode.

The sensor driver 220 in the first tracking mode may update the offset data DATA_O (or the baseline BL) according to a preset rule (or a first rule), and may update, in the second tracking mode, the offset data DATA_O according to a changed rule (or a second rule different from the first rule). Hereinafter, mode conversion between the first tracking mode and the second tracking mode may be a rule change (e.g., a change between the first rule and the second rule).

In an embodiment, the rule may include a set value for whether to update the offset data DATA_O. In other words, the rule may include a value that determines whether to update the offset data DATA_O or not. The rule in the first tracking mode may have a set value of "activation (or ON)" indicating that the offset data DATA_O is to be updated. The rule in the second tracking mode may have a set value of "deactivation (or OFF)" indicating that the offset data DATA_O is not to be updated. In this case, in the second tracking mode, the sensor driver 220 may not update the offset data DATA_O. In other words, in the second tracking mode, the sensor driver 220 may not perform a baseline tracking operation.

In embodiments, in the second tracking mode, the sensor driver 220 may perform the baseline tracking operation, and may reduce at least one of a weighted value, a setting cycle (or an updating cycle), and an application area of the offset data DATA_O.

For example, referring to FIG. 10, the sensor driver 220 may set/update the offset data DATA_O based on a sensing signal (or filtered data DATA_F (refer to FIG. 6)). The sensor driver 220 may apply a first weighted value R1 to the sensing signal to set the offset data DATA_O in the first tracking mode, and may apply a second weighted value R2 to the sensing signal to set the offset data DATA_O in the second tracking mode. The second weighted value R2 may be less than or equal to the first weighted value R1. For instance, the first weighted value R1 may be 100%, and the second weighted value R2 may be approximately 30%. In other words, in the second mode, the weighted value of the offset data DATA_O may be reduced. Therefore, even if the offset data DATA_O (or the baseline BL) varies due to the maintenance of the proximity of the object OBJ, the reduced weighted value reduces the variation in the offset data DATA_O, so that the probability of a sensing error from occurring, which is attributable to the offset data DATA_O (or the baseline BL), may be mitigated or removed.

For example, the sensor driver 220 may update the offset data DATA_O to a first frequency F1 in the first tracking mode, and may update the offset data DATA_O to a second frequency F2 in the second tracking mode. The second frequency F2 may be less than or equal to the first frequency F1. For instance, the first frequency F1 may be 10 Hz, and the second frequency F2 may be approximately 1 Hz. In other words, in the second mode, the setting cycle of the offset data DATA_O may be reduced. In an embodiment, when the maximum change rate of the offset data DATA_O is limited, the offset data DATA_O may be smoothly changed by the reduced setting cycle, so that the probability of a sensing error from occurring, which is attributable to the offset data DATA_O (or the baseline BL), may be mitigated or removed.

For example, the sensor driver 220 may update, in the first tracking mode, the offset data DATA_O for a first area A1 of the sensor component 120 (or the sensing area SA), and may update, in the second tracking mode, the offset data DATA_O for a second area A2 of the sensor component 120 (or the sensing area SA). The second area A2 may be less than or equal to the first area A1. For example, the first area A1 may correspond to the entire area of the sensor component 120 (or the sensing area SA), and the second area A2 may correspond to a partial area (e.g., a portion) of the sensor component 120 (or the sensing area SA). For instance, referring to FIG. 11, in the case where a touch, proximity, or the like of the object OBJ occurs in a first sub-area PSA1 of the sensing area SA, the second area A2 may be a second sub-area PSA2 in the sensing area SA except the first sub-area PSA1. In other words, in the second tracking mode, the sensor driver 220 may perform a baseline tracking operation on only the second sub-area PSA2 without performing a baseline tracking operation on the first sub-area PSA1. However, the present disclosure is not limited to the foregoing. For example, in the second tracking mode, the sensor driver 220 may perform a baseline tracking operation on the first sub-area PSA1 according to the second rule (e.g., with the second weighted value R2 and/or the second frequency F2), and may perform a baseline tracking operation on the second sub-area PSA2 according to the first rule (e.g., with the first weighted value R1 and/or the first frequency F1). In other words, the changed rule may be applied to only the first sub-area PSA1 in which the touch, proximity, or the like of the object OBJ has occurred.

The second weighted value R2, the second frequency F2, and the second area A2 may be changed depending on a combination of the weighted value, the setting cycle, and the application area of the offset data DATA_O. For example, in the case where the baseline tracking operation is performed on only the second sub-area PSA2, the second weighted value R2 may be the same as the first weighted value R1, and the second frequency F2 may be the same as the first frequency F1. In another example, when both the weighted value and the setting cycle are changed, the second weighted value R2 (or the second frequency F2) may be greater than the second weighted value R2 (or the second frequency F2) when only one of the weighted value and the setting cycle is changed).

In an embodiment, the sensor driver 220 may perform a mode conversion from the first tracking mode to the second tracking mode when an event occurs or immediately after an event has occurred.

FIG. 12 illustrates variation in distance between the sensor component 120 and the object OBJ as a function of time. For example, at a first time point t1, when the distance between the sensor component 120 and the object OBJ corresponds to a first threshold distance ds1 (or a first reference distance), the sensor driver 220 may determine that the object OBJ has approached the sensor component 120 to a sufficient extent. In other words, at the first time t1, an event that is called proximity of the object OBJ may occur. Before the first time point t1, the sensor driver 220 is operated in the first tracking mode, and the display component 110 may display an image, or the pixel PX may emit light (e.g., display state ON).

When the proximity of the object OBJ has been sensed, the sensor driver 220 may be operated in the second tracking mode. In some cases, the first tracking mode in the second mode may be referred to as a second mode. The second tracking mode in the second mode may be referred to as a third mode. For example, in response to the event in which the object OBJ has approached the sensor component 120 within the first threshold distance ds1, the sensor driver 220 may be converted from the first tracking mode to the second tracking mode and then operated in the second tracking mode. In other words, after the object OBJ has breached the first threshold distance ds1, the sensor driver 220 may enter the second tracking mode. After the first time point t1, the sensor driver 220 is operated in the second tracking mode, and the display component 110 may not display an image, or the pixel PX may not emit light (e.g., non-display state OFF). For example, in the case where the ear or the cheek of the user approaches the sensor area SA, the user cannot see the display component 110. Hence, even though the display component 110 does not display an image, this is not an issue.

The sensor driver 220 may sense removal of the object OBJ while being operated in the second tracking mode (or the third mode). For example, at a second time point t2 at which the distance between the sensor component 120 and the object OBJ corresponds to a second threshold distance ds2 (or a second reference distance), the sensor driver 220 may determine that the object OBJ has been removed from the sensor component 120 by a sufficient distance. In an embodiment, the second threshold distance ds2 may be greater than the first threshold distance ds1. Hence, the third mode is designed to prevent cancellation even if the user who is on the phone slightly moves his/her body away from the display device 1, so that user-friendliness can be improved. After the second time point t2, the sensor driver 220 is operated again in the first tracking mode, and the display component 110 may display an image (e.g., display state ON). In other words, in response to the removal of the object OBJ away from the sensor component 120 by the second threshold distance ds2, the sensor driver 220 may be converted from the second tracking mode to the first tracking mode and then operated in the first tracking mode.

After the second time point t2, the sensor driver 220 may be operated in the first mode (at step S101) or operated in the second mode (at step S103) according to a scenario of the display device 1.

In an embodiment, the sensor driver 220 may perform mode conversion at a time point that has passed a preset time from a time point of occurrence of an event.

Referring to FIGS. 12 and 13, an embodiment of FIG. 13 other than the time point of the conversion from the first tracking mode to the second tracking mode is substantially identical or similar to the embodiment of FIG. 12; therefore, a redundant explanation thereof will be omitted. For example, at a first time point t1 at which the distance between the sensor component 120 and the object OBJ corresponds to the first threshold distance ds1 (or the first reference distance), the sensor driver 220 may determine that the object OBJ has sufficiently approached the sensor component 120.

At a third time point t3 that has passed a specific time (or a preset time) from the first time point t1, the sensor driver 220 may be converted from the first tracking mode to the second tracking mode and then operated in the second tracking mode. After the first time point t1, the display component 110 may not display an image, or the pixel PX may not emit light (e.g., non-display state OFF). After the third time point t3, the sensor driver 220 may be operated in the second tracking mode. In other words, the time point (e.g., the third time point t3) of the conversion of the sensor driver 220 from the first tracking mode to the second tracking mode may differ from a state change time point (e.g., the first time point t1) of the display component 110.

At the third time point t3, the distance between the sensor component 120 and the object OBJ may be a third distance ds3. The third distance ds3 may be less than the first threshold distance ds1. Referring to FIG. 14, as the distance between the sensor component 120 and the object OBJ is reduced, a variation in capacitance by the object OBJ may be increased, and sensor output (e.g., output of the sensor component 120 or variation thereof, e.g., output of the analog-digital converter 224 of FIG. 4) may be increased. For example, second sensor output SO2 at the third distance ds3 may be greater than first sensor output SO1 at the third threshold distance ds1. As the sensor output is increased, a signal noise ratio (SNR) of a sensing signal is heightened. The offset data DATA_O (or the baseline BL) that is set based on a sensing signal having a high SNR may be more accurate. Therefore, in the case where the mode has been converted from the first tracking mode to the second tracking mode with the offset data DATA_O more accurately set, the sensor driver 220 may more accurately sense the removal of the object OBJ.

As described above, in performing the proximity sensing operation by the sensing driver 220, with regard to setting and updating the offset data DATA_O (or the baseline BL), the sensor driver 220 may be operated in the first tracking mode, and may perform mode conversion to the second tracking mode when an event has occurred. In the second tracking mode, the sensor driver 220 may not perform the baseline tracking operation, or may reduce at least one of the weighted value, the setting cycle (or the updating cycle), and the application area of the offset data DATA_O. Therefore, an error can be prevented from occurring in sensing the input due to an error in setting/updating the offset data DATA_O.

Figure 15:
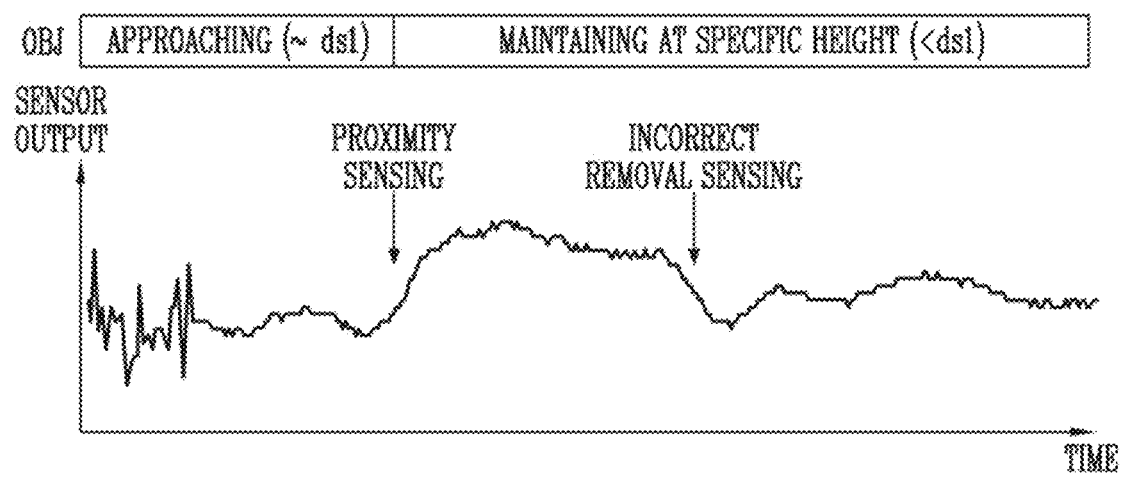
FIG. 15 is a diagram illustrating a comparative example of variation in the sensor output of the sensor component over time.

FIG. 15 is a diagram illustrating a comparative example of variation in the sensor output of the sensor component over time.

Referring to FIGS. 1, 4, 12, and 15, a sensor driver according to the comparative example may perform a baseline tracking operation without changing the rule for updating/setting the offset data DATA_O, regardless of proximity of the object OBJ. In other words, the sensor driver according to the comparative example may be operated in the first tracking mode, irrespective of the proximity of the object OBJ.

In the case where the object OBJ approaches the sensor component 120 to the first threshold distance ds1 (or the first reference distance), the sensor output may be relatively high, and the sensor driver according to the comparative example may determine that the object OBJ has sufficiently approached the sensor component 120. In other words, the sensor driver according to the comparative example may sense the proximity of the object OBJ. The sensor output may correspond to the output of the analog-digital converter 224 of FIG. 4.

While the object OBJ approaches the sensor component 120 to the first threshold distance ds1 (or the first reference distance), the sensor output may vary due to surrounding environmental factors. For example, the operation of the display component 110 for displaying an image may act as a noise for the sensor output, so that the sensor output may vary. Even if the sensor output varies, the baseline tracking operation may be performed to accurately sense a touch or proximity.

While the object OBJ is maintained at a specific height (e.g., a height less than the first threshold distance ds1) over the sensor component 120, the sensor output may be reduced. It is ideal that the sensor output remains constant while the object OBJ is maintained at a specific height over the sensor component 120. However, due to the baseline tracking operation, for example, the baseline BL of FIG. 7 may be heightened, so that the sensor output may be reduced.

In the case where the sensor output is reduced by a specific level, the sensor driver according to the comparative example may determine that the object OBJ has been removed from the sensor component 120, despite the fact that the object OBJ is maintained at a specific height over the sensor component 120. In other words, the sensor driver according to the comparative example may incorrectly sense the removal of the object OBJ.

On the other hand, the sensor driver 220 in accordance with embodiments of the present disclosure may convert the mode from the first tracking mode to the second tracking mode when an event such as the proximity of the object OBJ has occurred. In the second tracking mode, the sensor driver 220 may not perform the baseline tracking operation, or may reduce at least one of the weighted value, the setting cycle (or the updating cycle), and the application area of the offset data DATA_O. Therefore, while the object OBJ is maintained at a specific height over the sensor component 120, the variation of the sensor output may be mitigated or prevented, so that the removal of the object OBJ is not incorrectly sensed.

For reference, in the first mode for touch sensing, the sensor output due to the touch input is relatively large, so that the variation of the offset data DATA_O due to the baseline tracking operation may not significantly influence the touch sensing. For example, an incorrect sensing error such as touch input cancellation by the baseline tracking operation may not occur. Unlike this, in the second mode for proximity sensing, the sensor output due to the proximity is relatively small (e.g., equal to or less than 1/10 of the sensor output due to the touch input), and thus, a variation of the offset data DATA_O due to a general baseline tracking operation may significantly influence the proximity sensing (particularly, a determination related to the removal of the object OBJ). Therefore, only in the second mode, the sensor driver 220 in accordance with embodiments of the present disclosure may convert the mode from the first tracking mode to the second tracking mode in response to an event such as proximity of the object OBJ. However, the present disclosure is not limited to the foregoing. For example, in the first mode, the mode may also be converted from the first tracking mode to the second tracking mode in response to an event such as proximity of the object OBJ.

In a display device and a method of driving the display device in accordance with embodiments of the present disclosure, offset data (or a baseline) corresponding to a state of no input may be periodically set/updated, and the offset data may be reflected in a sensing signal to sense input from the object. Furthermore, in the case where an event such as proximity, a touch, or the like of the object occurs, the display device may change a rule or mode for setting/updating the offset data. In the display device and the method of driving the display device, according to the changed rule or mode, a baseline tracking operation may not be performed (or the offset data may not be updated), or at least one of a weighted value, a setting cycle (or an updating cycle), and an application area of the offset data may be reduced. Therefore, an error can be prevented from occurring in sensing the input due to an error in setting/updating the offset data (or the baseline).

The effects of the present disclosure are not limited by the foregoing.

While the spirit and scope of the present disclosure have been described above with reference to the embodiments, it should be noted that the above-described embodiments are merely descriptive and should not be considered limiting. For example, it should be understood by those skilled in the art that various changes, substitutions, and alternations may be made herein without departing from the scope of the disclosure as set forth by the following claims.

What is claimed is:

1. A display device comprising:
   a display panel configured to display an image;
   a sensor overlapping the display panel; and
   a processor connected to the sensor, and configured to sense input from an object, in response to a sensing signal provided from the sensor,
   wherein the processor obtains, in response to the sensing signal, offset data that corresponds to a case where there is no input, and senses the input by reflecting the offset data to the sensing signal,
   wherein the processor senses touch input from the object in a first mode, and senses proximity of the object in a second mode,
   wherein the processor changes a rule related to obtaining the offset data in response to an event occurring in the second mode, and
   wherein the rule includes information about whether to update the offset data, a ratio at which the sensing signal is applied to the offset data, a cycle of updating the offset data, or an area of the sensor to which an update of the offset data is applied.

2. The display device according to claim 1, wherein the event includes a case where the proximity of the object is sensed, a case where a touch of the object occurs, or a case where display of the image on the display panel is suspended.

3. The display device according to claim 1, wherein the processor changes the rule at a second time point that has passed a preset time from a first time point that corresponds to when the event occurs in the second mode.

4. The display device according to claim 3, wherein the display panel displays the image before the first time point, and the display panel does not display the image after the first time point.

5. The display device according to claim 1, wherein the processor suspends the update of the offset data in response to the event.

6. The display device according to claim 1, wherein the processor reduces the ratio at which the sensing signal is applied to the offset data, in response to the event.

7. The display device according to claim 1, wherein the processor reduces the cycle of updating the offset data, in response to the event.

8. The display device according to claim 1, wherein the processor updates the offset data for only a portion of the sensor other than the area of the sensor where the input is received, in response to the event.

9. The display device according to claim 1, wherein the processor changes the rule for only a portion of the sensor where the input is received, in response to the event.

10. The display device according to claim 1, wherein characteristics of a driving signal for driving the sensor in the first mode are different from characteristics of the driving signal in the second mode, and
wherein the characteristics include a number of transmission lines to which the driving signal is simultaneously applied, a voltage level, or a frequency.

11. A method of driving a display device including a processor connected to a sensor that overlaps a display panel, the method comprising:
operating the display device in a first mode for sensing input from an object, based on a sensing signal output from the sensor;
operating the display device in a second mode for sensing proximity of the object, based on the sensing signal; and
operating, when an event has occurred in the second mode, the display device in a third mode, wherein in the third mode a rule related to obtaining offset data is changed,
wherein the offset data corresponds to a case where there is no input, and the offset data is obtained based on the sensing signal according to the rule, and
wherein the operating the display device in the third mode comprises changing the rule at a second time point that has passed a preset time from a first time point at which the event has occurred.

12. The method according to claim 11, wherein, in the second mode and the first mode, the offset data is obtained according to a first rule, and
wherein, in the third mode, the offset data is obtained according to a second rule different from the first rule.

13. The method according to claim 11, wherein the event includes a case where the proximity of the object is sensed, a case where a touch of the object occurs, or a case where display of an image on the display panel is suspended.

14. The method according to claim 11, wherein operating the display device in the third mode further comprises:
displaying no image on the display panel from the first time point at which the event occurs.

15. The method according to claim 11, wherein the rule includes information about whether to update the offset data, a ratio at which the sensing signal is applied to the offset data, a cycle of updating the offset data, and an area of the sensor to which an update of the offset data is applied.

16. The method according to claim 11, wherein operating the display device in the third mode comprises suspending the update of the offset data.

17. The method according to claim 11, wherein operating the display device in the third mode comprises reducing the ratio at which the sensing signal is applied to the offset data.

18. The method according to claim 11, wherein operating the display device in the third mode comprises reducing the cycle of updating the offset data.

19. The method according to claim 11, wherein operating the display device in the third mode comprises updating the offset data for only a portion of the sensor other than an area of the sensor where the input is received.

20. A display device comprising:
a display panel configured to display an image;
a sensor overlapping the display panel; and
a processor connected to the sensor, and configured to sense input from an object, in response to a sensing signal provided from the sensor,
wherein the processor obtains, in response to the sensing signal, offset data that corresponds to a case where there is no input, and senses the input by reflecting the offset data to the sensing signal,
wherein the processor senses touch input from the object in a first mode, and senses proximity of the object in a second mode,
wherein the processor changes a rule related to obtaining the offset data in response to an event occurring in the second mode, and
wherein the processor changes the rule at a second time point that has passed a preset time from a first time point that corresponds to when the event occurs in the second mode.

* * * * *